United States Patent
Park et al.

(10) Patent No.: US 9,461,324 B2
(45) Date of Patent: Oct. 4, 2016

(54) AUTOTHERMAL REFORMING CATALYST FOR MONOLITHIC FUEL CELL

(71) Applicant: H&Power, Inc., Daejeon (KR)

(72) Inventors: Jin Woo Park, Daejeon (KR); Woo Jin Kang, Daejeon (KR); In Yong Kang, Daejeon (KR); Joong Myeon Bae, Daejeon (KR)

(73) Assignee: H&POWER, INC., Daejeon (KR)

( * ) Notice: Subject to any disclaimer, the term of this patent is extended or adjusted under 35 U.S.C. 154(b) by 6 days.

(21) Appl. No.: 14/243,155

(22) Filed: Apr. 2, 2014

(65) Prior Publication Data

US 2015/0288016 A1 Oct. 8, 2015

(51) Int. Cl.
| | | |
|---|---|---|
| *B01J 21/00* | (2006.01) | |
| *B01J 21/04* | (2006.01) | |
| *B01J 23/00* | (2006.01) | |
| *B01J 23/02* | (2006.01) | |
| *B01J 23/08* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 23/70* | (2006.01) | |
| *B01J 23/72* | (2006.01) | |
| *H01M 8/06* | (2016.01) | |
| *B01J 35/04* | (2006.01) | |
| *B01J 23/63* | (2006.01) | |
| *B01J 37/02* | (2006.01) | |
| *B01J 23/89* | (2006.01) | |

(52) U.S. Cl.
CPC ............. *H01M 8/0618* (2013.01); *B01J 23/63* (2013.01); *B01J 23/892* (2013.01); *B01J 23/8926* (2013.01); *B01J 35/04* (2013.01); *B01J 37/0219* (2013.01); *B01J 37/0244* (2013.01); *Y10T 442/10* (2015.04)

(58) Field of Classification Search
CPC ........ B01J 21/00; B01J 23/42; B01J 23/892; B01J 23/8926
USPC ........ 502/245, 304, 326–327, 331–335, 337, 502/339, 346, 349, 355, 439, 527.19, 502/527.24, 251, 263
See application file for complete search history.

(56) References Cited

U.S. PATENT DOCUMENTS

| | | | | |
|---|---|---|---|---|
| 4,006,103 A | * | 2/1977 | Meguerian | ......... B01D 53/9418 423/213.5 |
| 4,012,486 A | * | 3/1977 | Singleton | ............... B01D 53/52 423/224 |
| 4,757,045 A | * | 7/1988 | Turner | ................. B01D 53/945 423/213.5 |
| 5,494,700 A | * | 2/1996 | Anderson et al. | ............ 427/115 |
| 7,709,414 B2 | * | 5/2010 | Fujdala et al. | ................ 502/326 |

(Continued)

OTHER PUBLICATIONS

Inyong Kang et al., "Autothermal reforming study of diesel of fuel cell application", Journal of Power Sources, 2006, pp. 1283-1290, vol. 159.

J.-M. Bae et al., "Microchennel development for autothermal reforming of hydrocarbon fuels", Journal of Power Sources, 2005, pp. 91-95, vol. 139.

(Continued)

*Primary Examiner* — Cam N. Nguyen
(74) *Attorney, Agent, or Firm* — Rabin & Berdo, P.C.

(57) ABSTRACT

Provided is an autothermal reforming catalyst for a fuel cell, including: a monolithic catalyst; and a support formed on the monolithic catalyst, wherein the support is a metal foam, a metal mesh or a monolithic structure.

4 Claims, 4 Drawing Sheets

(56) References Cited

U.S. PATENT DOCUMENTS

| | | | | |
|---|---|---|---|---|
| 8,062,623 | B2* | 11/2011 | Daly et al. | 423/651 |
| 8,277,773 | B2* | 10/2012 | Watson et al. | 423/594.16 |
| 2011/0313188 | A1* | 12/2011 | Wigbers | B01J 23/78 558/459 |
| 2013/0217793 | A1* | 8/2013 | Wang et al. | 518/717 |

OTHER PUBLICATIONS

Sangho Yoon et al., "Suppression of ethylene-induced carbon deposition in diesel autothermal reforming", International Journal of Hydrogen Energy, 2009, pp. 1844-1851, vol. 34.

Inyong Kang et al., "The micro-reactor testing of catalysts and fuel delivery apparatuses for diesel autothermal reforming", Catalysis Today, 2008, pp. 249-257, vol. 136.

* cited by examiner

AUTOTHERMAL REFORMING CATALYST FOR MONOLITHIC FUEL CELL

TECHNICAL FIELD

The present disclosure relates to an autothermal reforming catalyst for a monolithic fuel cell, more particularly to an autothermal reforming catalyst for a monolithic fuel cell wherein a support is provided on a monolithic catalyst for efficiency improvement and easier reforming.

BACKGROUND

A fuel cell is an electricity-generating system for directly converting chemical energy into electric energy through a chemical reaction between hydrogen or hydrogen contained in hydrocarbon materials such as methanol or ethanol with an oxidizing agent.

Representative examples of the fuel cell include a polymer electrolyte membrane fuel cell (PEMFC) and a direct oxidation fuel cell. A direct oxidation fuel cell using methanol as fuel is called a direct methanol fuel cell (DMFC).

In general, the polymer electrolyte membrane fuel cell is advantageous in high energy density and high output. To produce hydrogen from the fuel, a fuel reformer for reforming methane, methanol, natural gas, etc. is necessary.

Fuel reforming may be classified into steam reforming, partial oxidation reforming and autothermal reforming depending on the reforming method. Although steam reforming exhibits high hydrogen production efficiency, response is slow because the associated reaction is endothermic and heat has to be supplied. Partial oxidation (PDX) reforming exhibits fast response because the associated reaction is exothermic and heat supply is unnecessary, but hydrogen yield is not high. Autothermal reforming (ATR) has the advantages of the above-described two reforming methods: less energy input and fast response.

In autothermal reforming, a catalyst is used to reform fuel gas. In general, the catalyst is in powder form and has spherical, cylindrical or pellet shape depending on reaction condition and state. However, in order to process the catalyst into the desired shape, an additive such as a binder is necessary. In addition, the existing catalyst has the problems of low specific surface area and pressure difference.

Although a monolithic catalyst has been developed to improve the problems, reactivity is low due to insufficient gas mixing and fast gas flow in the monolith.

SUMMARY

The present disclosure is directed to providing an autothermal reforming catalyst for a fuel cell having high specific surface area, being capable of preventing pressure difference caused by pressure drop by inducing fast reaction and exhibiting superior durability.

In one general aspect, the present disclosure provides an autothermal reforming catalyst for a fuel cell, including: a monolithic catalyst; and a support formed on the monolithic catalyst, wherein the support is a metal foam, a metal mesh or a monolithic structure.

In an exemplary embodiment of the present disclosure, the support is formed on the entire area of the monolithic catalyst.

In an exemplary embodiment of the present disclosure, the support is an Inconel mesh and the monolithic catalyst includes: a monolithic substrate; a buffer layer formed on the monolithic substrate and including a mixture of at least one first oxide selected from a group consisting of zirconium oxide, cerium oxide, copper oxide and nickel oxide and a second oxide as one or more constituent of the monolithic substrate; and a metal catalyst layer formed on the buffer layer.

The autothermal reforming catalyst for a fuel cell according to the present disclosure includes: a monolithic catalyst; and a support formed on the monolithic catalyst, wherein the support is one of a metal foam, a metal mesh and a monolithic catalyst. Although the monolithic catalyst is advantageous in terms of high specific surface area and small pressure difference, reactivity is low because of insufficient gas mixing and fast gas flow inside the monolith during fuel reforming. To solve this problem, the present disclosure provides a support such as a metal foam on the monolithic catalyst so as to increase contact time between the catalyst and reaction gas by improving mixing with the reaction gas and reducing flow rate inside monolithic channels. In addition, the autothermal reforming catalyst for a fuel cell according to the present disclosure has a structure in which a mixed oxide layer (buffer layer) and a metal catalyst layer are formed on a monolithic structure. Since the buffer layer includes the same material as the monolithic catalyst, the mechanical durability between the support and the catalyst may be improved. In addition, since the catalyst has increased specific surface area because of the monolithic structure and sufficient reaction is ensured in the microchannels of the monolithic catalyst, the problem of pressure difference caused by pressure drop and imbalance may be prevented.

BRIEF DESCRIPTION OF DRAWINGS

The above and other objects, features and advantages of the present disclosure will become apparent from the following description of certain exemplary embodiments given in conjunction with the accompanying drawings, in which.

DETAILED DESCRIPTION OF EMBODIMENTS

The advantages, features and aspects of the present disclosure will become apparent from the following description of the embodiments with reference to the accompanying drawings, which is set forth hereinafter. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

The inventors of the present disclosure have noted that mixing of gas before entry into a catalyst is very important for a catalyst having a monolithic structure. That is to say, if sufficient mixing of gas is not achieved before entry into a catalyst, gas mixing does not occur inside the monolith and, as a result, the efficiency of the monolithic catalyst decreases. Thus, in the present disclosure, a support is provided above a monolithic catalyst for gas mixing before the gas enters the catalyst and passes through a channel of the monolithic catalyst. As a result, a well-mixed gas passes through the monolithic channel and the efficiency of a fuel cell is improved.

Figure 1:
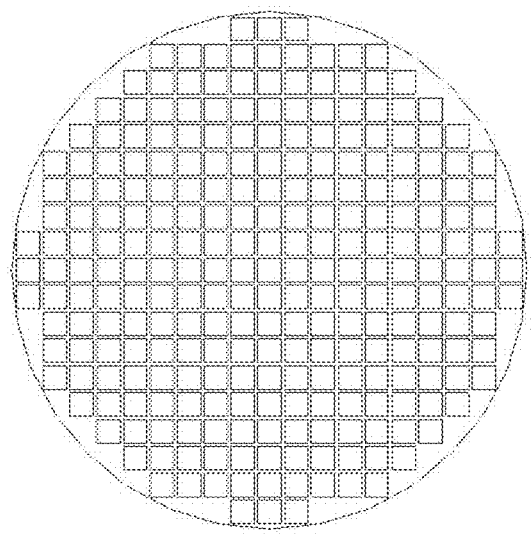
FIGS. 1 and 2 are respectively a plan view and a cross-sectional view of an autothermal reforming catalyst for a fuel cell according to an exemplary embodiment of the present disclosure.
Figure 2:
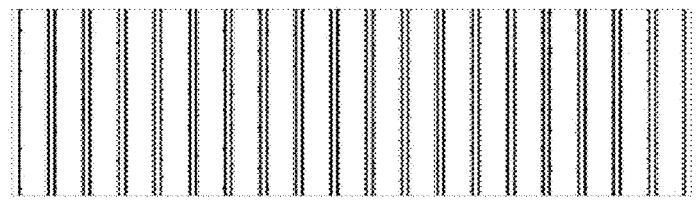

FIGS. 1 and 2 are respectively a plan view and a cross-sectional view of a monolithic catalyst according to the present disclosure;

Referring to FIGS. 1 and 2, a monolithic catalyst according to the present disclosure has a structure in which channels cross each other horizontally and pass through the catalyst vertically. As a result, a sufficient area for reaction may be provided.

However, as described above, such a monolithic catalyst is problematic in that gas mixing in the channels is difficult because the channel area is not relatively small. To solve this problem, the present disclosure provides a support which provides channels through which the gas enters a monolithic catalyst therebelow.

Figure 3:
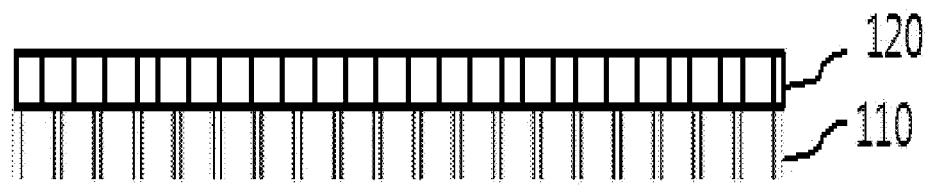
FIGS. 3 and 4 are cross-sectional views of a monolithic catalyst used in an autothermal reforming catalyst according to an exemplary embodiment of the present disclosure.

FIG. 3 shows a cross-sectional view of an autothermal reforming catalyst for a fuel cell according to an exemplary embodiment of the present disclosure.

Referring to FIG. 3, an autothermal reforming catalyst for a fuel cell according to the present disclosure includes a monolithic catalyst layer 110, which has been described referring to FIGS. 1 and 2, and a support 120 provided on the catalyst layer 110. The support layer has channels wherein gas can be mixed while transporting a considerable distance. For example, the support layer may be a metal foam, a metal mesh or another monolithic structure.

In the catalyst shown in FIG. 3, the support in the form of a metal mesh improves the mixing of gas and, thereby, helps the catalyst to react with a gas of ideal mixing composition. That is to say, in the present disclosure, in order to prevent insufficient mixing that may occur when reaction gas enters the monolithic catalyst layer 110 because of fast flow, the channels through which the reaction gas travel are formed before entry to the monolithic catalyst layer 110. As a result, the problem of decreased reactivity due to insufficient gas mixing in the monolith can be solved. Accordingly, the support 120 may be considered as a sort of buffer layer for improving catalytic efficiency through improved mixing of the reaction gas. In an exemplary embodiment of the present disclosure, the support 120 may be an Inconel mesh. Besides, a metal foam or a monolithic structure through which gas can penetrate in a predetermined direction may be used.

In an exemplary embodiment of the present disclosure, the support may be provided on the entire area of the monolithic catalyst layer 110 in the inflow direction of gas so as to uniformly increase the time for reaction of the monolithic catalyst with the reaction gas. In an exemplary embodiment of the present disclosure, the support may be an Inconel mesh.

The metal catalyst layer needs to be coated on the channels of the monolithic catalyst, which are of relatively small size. However, it is difficult to ensure sufficient adhesion between the monolithic catalyst and the metal catalyst layer with the existing technology. In this regard, the present disclosure provides an autothermal reforming catalyst for a fuel cell having a structure shown in FIG. 4.

Figure 4:
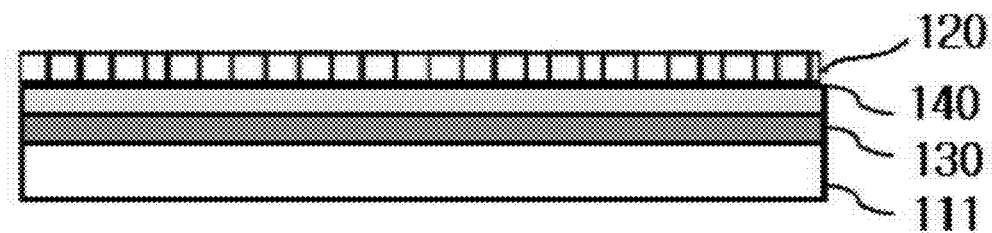

FIG. 4 shows a cross-sectional view of an autothermal reforming catalyst for a fuel cell according to an exemplary embodiment of the present disclosure.

Referring to FIG. 4, the monolithic catalyst layer 110 of FIG. 3 includes a catalyst layer 111 having a monolithic structure. In an exemplary embodiment of the present disclosure, the monolithic catalyst layer 110 includes a magnesium aluminum silicate composite material.

A buffer layer 130 is coated on the monolithic catalyst layer 110. In an exemplary embodiment of the present disclosure, the buffer layer 130 includes a mixture of at least one first oxide selected from a group consisting of zirconium oxide, cerium oxide, copper oxide and nickel oxide and a second oxide as one or more constituent of the monolithic catalyst. In an exemplary embodiment of the present disclosure, the first oxide may be cerium oxide and the second oxide may be alumina, and the weight ratio of the first oxide and the second oxide may be specifically from 2:8 to 4:6. The buffer layer 130 ensures sufficient adhesion between the support and the catalyst layer.

That is to say, the first oxide in the buffer layer 130 provides sufficient adhesion with the metal catalyst layer during heat treatment after a slurry of the metal catalyst layer has been coated. The second oxide may be one or more constituent of the monolithic catalyst, e.g., aluminum oxide (alumina) and may provide sufficient adhesion between the buffer layer 130 and the monolithic catalyst after a slurry for coating a buffer layer has been coated on the monolithic catalyst layer 110.

In an exemplary embodiment of the present disclosure, a metal catalyst layer 140 is formed on the buffer layer 130 and the metal catalyst layer 140, e.g., a platinum layer, may be sufficiently adhered to the monolithic catalyst 110 owing to the buffer layer 130.

Figure 5:
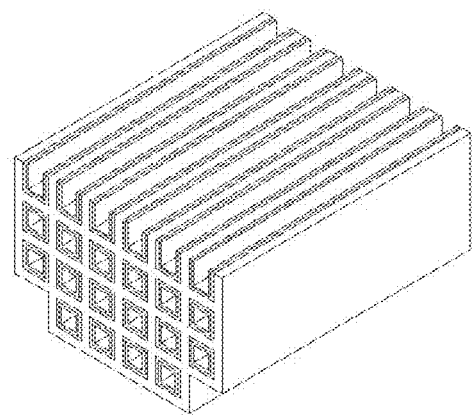
FIGS. 5 and 6 are a perspective view and an enlarged perspective view of a monolithic catalyst having a monolithic catalyst-buffer layer-metal catalyst layer structure prepared according to an exemplary embodiment of the present disclosure.
Figure 6:
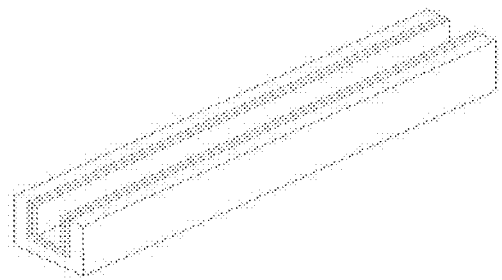

FIGS. 5 and 6 show a perspective view and an enlarged perspective view of a monolithic catalyst having a monolithic catalyst-buffer layer-metal catalyst layer structure prepared according to an exemplary embodiment of the present disclosure.

Referring to FIGS. 5 and 6, a plurality of channels are formed in the catalyst having a monolithic structure according to the present disclosure, and a buffer layer 130 and a metal catalyst layer 140 are formed on each channel. In an exemplary embodiment of the present disclosure, the monolithic catalyst having channels may be a composite support formed of magnesium aluminum silicate. A support (not shown) having a channel structure as described in FIG. 3 is formed on the metal catalyst layer 140 and, as a result, the contact time between the reaction gas and the catalyst is increased.

The present disclosure also provides a method for preparing an autothermal reforming catalyst for a fuel cell, including coating a slurry for coating each layer on a monolithic catalyst and heat-treating the coated slurry. The preparation method according to an exemplary embodiment of the present disclosure is described below.

Example

Preparation of Slurry for Coating Buffer Layer

Acetone and methanol were mixed at a weight ratio of 1:2. After mixing with terpineol- and glycerol-based additives, a 3:7 (based on weight) mixture of cerium oxide and alumina was added to prepare a slurry for coating a buffer layer.

Coating of Slurry for Coating Buffer Layer and Heat Treatment

Subsequently, a ceramic monolithic support was immersed in the slurry for coating a buffer layer, dried in a drying furnace of 250° C. for 2 hours and then baked in an electric furnace of 1150° C. for 4 hours to coat a buffer layer on the monolithic support.

Preparation of Slurry for Coating Metal Catalyst Layer

After mixing terpineol- and glycerol-based additives to a mixture solution of xylene and methanol (weight ratio=2:1), 0.5-5 wt % of platinum was added to prepare a slurry for coating a catalyst.

Coating of Slurry for Coating Metal Catalyst Layer and Heat Treatment

Subsequently, the ceramic monolithic support on which the buffer layer had been coated was immersed in the slurry for coating a catalyst, dried in a drying furnace of 250° C. for 2 hours and then baked in an electric furnace of 900° C. for 4 hours to form a metal catalyst layer. The temperature for heat-treating the slurry for coating a metal catalyst layer was set lower than that for heat-treating the slurry for coating a buffer layer in order to prevent damage of the multilayered structure due to excessively high temperature.

Test Example

The catalytic effect of the autothermal reforming catalyst prepared in the present disclosure was compared with that of a pellet-type catalyst according to the prior art.

Figure 7:
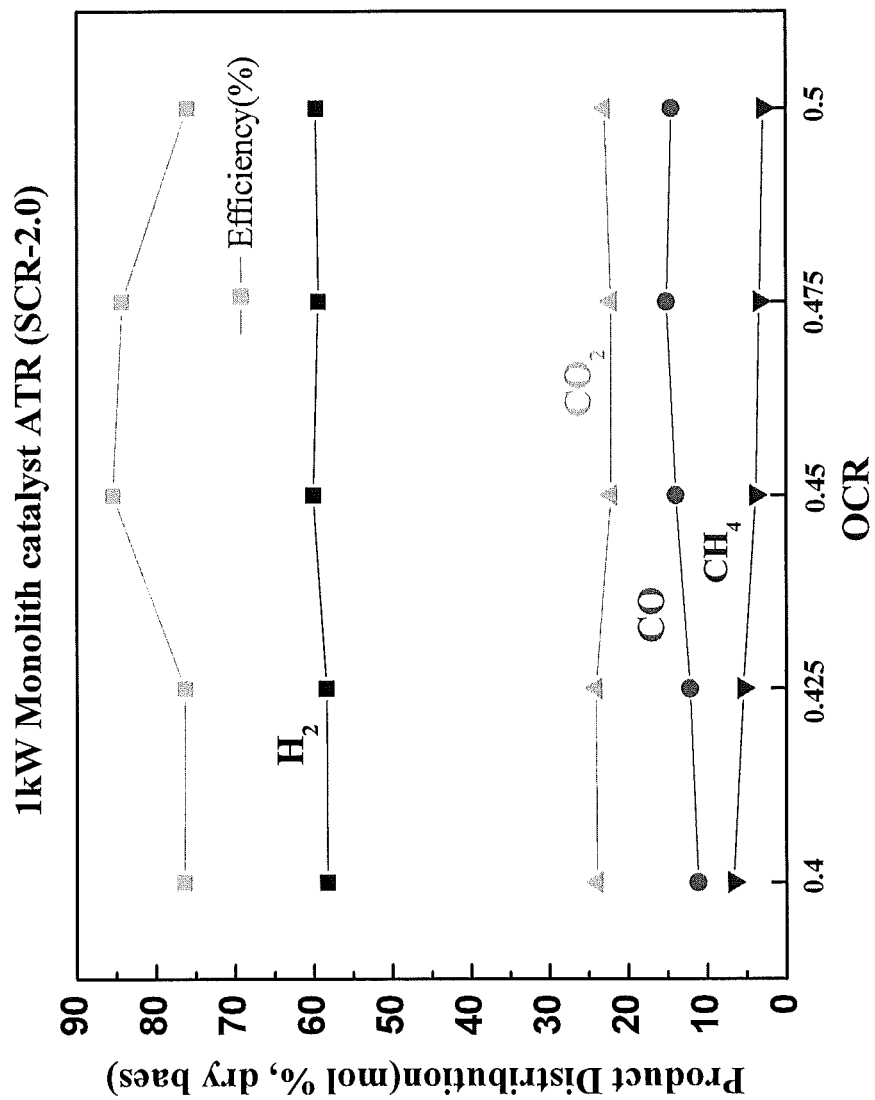
FIG. 7 shows a result of testing an autothermal reforming catalyst prepared according to an exemplary embodiment of the present disclosure with dimethyl ether (DME)
Figure 8:
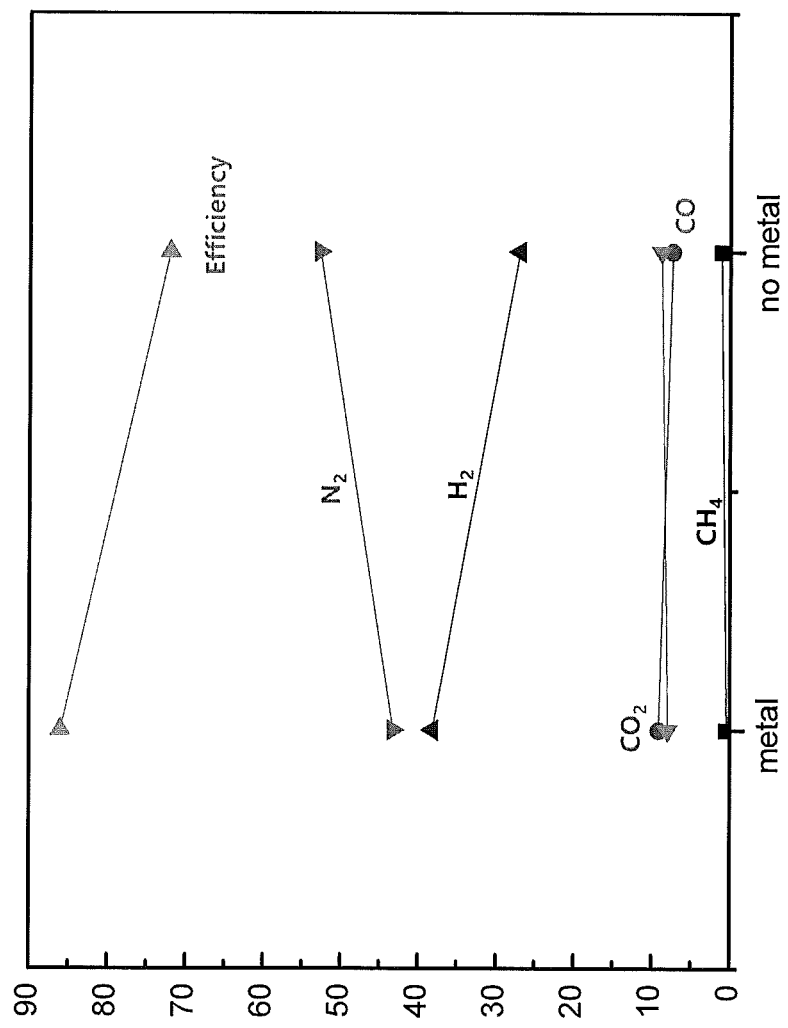
FIG. 8 shows a test result for a pellet-type catalyst as a comparative example.

FIG. 7 shows a result of testing an autothermal reforming catalyst prepared according to an exemplary embodiment of the present disclosure with dimethyl ether (DME), and FIG. 8 shows a test result for a pellet-type catalyst as a comparative example.

Referring to FIGS. 7 and 8, it can be seen that the autothermal reforming catalyst according to the present disclosure can greatly reduce the amount of the expensive platinum catalyst while maintaining the efficiency and durability comparable to those of the existing pellet-type catalyst.

While the present disclosure has been described with respect to the specific embodiments, it will be apparent to those skilled in the art that various changes and modifications may be made without departing from the spirit and scope of the disclosure as defined in the following claims.

What is claimed is:

1. An autothermal reforming catalyst for a fuel cell, comprising:
    a monolithic catalyst layer; and
    a support formed on the monolithic catalyst layer,
    wherein the monolithic catalyst layer includes a magnesium aluminum silicate composite material, and
    wherein the support is a metal foam, a metal mesh or a monolithic structure.

2. The autothermal reforming catalyst for a fuel cell according to claim 1, wherein the support is formed on the entire area of the monolithic catalyst layer.

3. The autothermal reforming catalyst for a fuel cell according to claim 1, wherein the support is an Inconel mesh.

4. The autothermal reforming catalyst for a fuel cell according to claim 1, wherein the monolithic catalyst layer comprises:
    a monolithic substrate;
    a buffer layer formed on the monolithic substrate and comprising a mixture of at least one first metal oxide selected from a group consisting of zirconium oxide, cerium oxide, copper oxide and nickel oxide and a second metal oxide as one or more constituent of the monolithic substrate; and
    a platinum layer formed on the buffer layer,
    wherein the monolithic substrate includes a magnesium aluminum silicate composite material, and
    wherein the second metal oxide is alumina.

* * * * *